US008869924B2

(12) United States Patent
Kim

(10) Patent No.: US 8,869,924 B2
(45) Date of Patent: Oct. 28, 2014

(54) HYBRID EXCAVATOR INCLUDING A FAST-STOPPING APPARATUS FOR A HYBRID ACTUATOR

(75) Inventor: Jae-Hong Kim, Gimhae-si (KR)

(73) Assignee: Volvo Construction Equipment AB, Eskilstuna (SE)

( * ) Notice: Subject to any disclaimer, the term of this patent is extended or adjusted under 35 U.S.C. 154(b) by 0 days.

(21) Appl. No.: 14/116,277

(22) PCT Filed: May 11, 2011

(86) PCT No.: PCT/KR2011/003458
§ 371 (c)(1), (2), (4) Date: Nov. 7, 2013

(87) PCT Pub. No.: WO2012/153880
PCT Pub. Date: Nov. 15, 2012

(65) Prior Publication Data

US 2014/0105714 A1 Apr. 17, 2014

(51) Int. Cl.

| | |
|---|---|
| ***B60W 10/00*** | (2006.01) |
| ***E02F 9/22*** | (2006.01) |
| ***E02F 3/30*** | (2006.01) |
| ***E02F 9/24*** | (2006.01) |
| ***E02F 9/26*** | (2006.01) |
| ***E02F 3/42*** | (2006.01) |
| ***F15B 20/00*** | (2006.01) |
| ***E02F 9/20*** | (2006.01) |
| ***E02F 3/43*** | (2006.01) |

(52) U.S. Cl.
CPC ............... *E02F 3/425* (2013.01); *E02F 9/2292* (2013.01); *F15B 2211/27* (2013.01); *F15B 2211/3138* (2013.01); *E02F 3/30* (2013.01); *F15B 2211/665* (2013.01); *E02F 9/24* (2013.01); *F15B 2211/3057* (2013.01); *E02F 9/265* (2013.01); *F15B 2211/755* (2013.01); *F15B 2211/20584* (2013.01); *F15B 2211/633* (2013.01); *F15B 2211/853* (2013.01); *F15B 20/00* (2013.01); *E02F 9/2075* (2013.01); *F15B 2211/6336* (2013.01); *E02F 3/435* (2013.01); *F15B 2211/7053* (2013.01); *F15B 2211/20561* (2013.01); *E02F 9/2271* (2013.01); *F15B 2211/20515* (2013.01); *F15B 2211/31529* (2013.01); *E02F 9/2278* (2013.01)
USPC .................................................... 180/65.265

(58) Field of Classification Search
USPC ........................................... 180/65.1–65.265
See application file for complete search history.

(56) References Cited

U.S. PATENT DOCUMENTS 5,645,290 A * 7/1997 Gaffney et al. .......... 280/33.998
5,785,328 A * 7/1998 Eckloff .................... 280/33.998

(Continued)

FOREIGN PATENT DOCUMENTS

EP 1905902 A2 4/2008
JP 2005127344 A 5/2005

(Continued)

OTHER PUBLICATIONS

International Search Report for PCT/KR2011/003458 mailed Feb. 15, 2012, citing the above reference(s).

*Primary Examiner* — John Walters
*Assistant Examiner* — James Triggs
(74) *Attorney, Agent, or Firm* — Lowe Hauptman & Ham, LLP

(57) ABSTRACT

The hybrid excavator includes: a first detection sensor for detecting an RCV-manipulated quantity; a second detection sensor for detecting the rotational speed of an electric motor; a hydraulic pump-motor connected to the electric motor; a hydraulic cylinder connected to the hydraulic pump-motor; first and second hydraulic valves installed in first and second passages, respectively, between the hydraulic pump-motor and the hydraulic cylinder; a third hydraulic valve for compensating for or bypassing a flow rate and a controller for receiving an RCV-manipulation signal from the first detection sensor and the rotational speed of the electric motor from the second detection sensor to compare the received values to data of previously stored working conditions, to output a control signal for switching the first and second hydraulic valves, and to block a working fluid from returning into the hydraulic cylinder, so as to thereby quickly stop the working device.

16 Claims, 3 Drawing Sheets

(56) References Cited

U.S. PATENT DOCUMENTS

| | | | | | |
|---|---|---|---|---|---|
| 5,970,709 | A * | 10/1999 | Tohji | 60/421 |
| 6,202,411 | B1 * | 3/2001 | Yamashita | 60/445 |
| 6,430,922 | B2 * | 8/2002 | Tohji | 60/421 |
| 7,178,333 | B2 * | 2/2007 | Oka | 60/421 |
| 7,392,653 | B2 * | 7/2008 | Sugano | 60/452 |
| 7,788,917 | B2 * | 9/2010 | DeMarco et al. | 60/452 |
| 7,904,225 | B2 * | 3/2011 | Takeda et al. | 701/50 |
| 8,511,080 | B2 * | 8/2013 | Krajnik et al. | 60/452 |
| 8,739,906 | B2 * | 6/2014 | Kawashima | 180/65.22 |
| 2001/0054286 | A1 * | 12/2001 | Tohji | 60/484 |
| 2005/0204734 | A1 * | 9/2005 | Oka | 60/428 |

FOREIGN PATENT DOCUMENTS

| | | | |
|---|---|---|---|
| JP | 2006125566 | A | 5/2006 |
| JP | 2006336304 | A | 12/2006 |
| JP | 2008248545 | A | 10/2008 |

* cited by examiner

HYBRID EXCAVATOR INCLUDING A FAST-STOPPING APPARATUS FOR A HYBRID ACTUATOR

CROSS-REFERENCE TO RELATED APPLICATION

This application is the National Phase application of International Application No. PCT/KR2011/003458 filed on May 11, 2011, which is incorporated herein by reference in its entirety.

FIELD OF THE INVENTION

The present invention relates to a hybrid excavator including a device that brings are electro-hydraulic actuator mounted thereon to a quick stop. More particularly, the present invention relates to a hybrid excavator that is configured to quickly stop a work apparatus (or attachment) operated, i.e., descending at high speed upon occurrence of a dangerous situation during the work in which a heavyweight object is moved such as pipe laying using an excavator mounted with a hybrid actuator (i.e., electro-hydraulic actuator: EHA).

BACKGROUND OF THE INVENTION

In general, an electro-hydraulic excavator expands and contracts a boom cylinder or the like by a hydraulic fluid discharged from an electro-hydraulic actuator (hydraulic pump-motor) operated according to the drive of an electric motor-generator (hereinafter, referred to as “electric motor”) to manipulate a work apparatus. In other words, the expansion and contraction of the boom cylinder can be controlled according to the forward and reverse rotation of the electric motor. A high pressure is generated in a large chamber of the boom cylinder due to its own weight during a boom-down operation in which the boom descends or is lowered. In addition, the hydraulic pump-motor is driven by the hydraulic fluid fed back thereto from the large chamber of the boom cylinder to cause the electric motor to generate electricity.

FIG. 3 is a graph showing the characteristics of the electro-hydraulic actuator (EHA).

In FIG. 3, a graph curve (a) represents the number of rotations and a torque, which can be generated by the electric motor constituting the electro-hydraulic actuator. A torque that can be generated by the electric motor which was applied with power is substantially equal to a torque that can be applied to the outside during the generation of electricity.

In FIG. 3, a graph curve (b) represents necessary energy converted into the number of rotations and a torque of the electric motor constituting the electro-hydraulic actuator in the case where an excavator receives a force from an engine to drive the work apparatus. In other words, since the graph curve (a) includes the entire section of the graph curve (b), a hybrid excavator having the electro-hydraulic actuator mounted thereon can generate a driving speed and a force larger than those of a hydraulic excavator that receives a torque from the engine to drive the work apparatus.

Meanwhile, in a hybrid excavator, in the case where the work apparatus is decelerated or descends by its own weight such as the boom-down operation, it is not operated by controlling a meter-out valve, but by receiving energy from the engine. For this reason, even when the work apparatus is operated at high speed, it can be stopped at high torque. If the energy is converted into the number of rotations and the torque of the electric motor-generator, it includes a hatched region (d).

In other words, during a high speed boom-down operation, the energy is equal to a speed and a torque corresponding to a point (c) where the graph curves (a) and (b) intersect with each other, and thus the work apparatus can be brought to a quick stop by closing the valve in the hydraulic excavator.

On the other hand, in the hybrid excavator having the electro-hydraulic actuator mounted thereon, when the work apparatus (i.e., a boom) performs a high speed boom-down operation (in this case, a point (e) requires a pressure higher than that in the point (c) where the graph curves (a) and (b) intersect with each other), the torque of the electric motor-generator being operated cannot be increased any longer, which makes it impossible to bring the work apparatus to a quick stop.

For this reason, in the case where a work such as pipe laying is performed with the aid of a worker, the work apparatus is not brought to a quick stop upon occurrence of a dangerous situation, thereby causing a safety accident.

DETAILED DESCRIPTION OF THE INVENTION

Technical Problems

Accordingly, the present invention has been made to solve the aforementioned problem occurring in the prior art, and it is an object of the present invention to provide a hybrid excavator including a device that brings an electro-hydraulic actuator mounted thereon to a quick stop, which is configured to quickly stop a work apparatus being operated at high speed upon occurrence of a dangerous situation during the work in which a heavyweight object is moved using a hybrid excavator, thereby securing safety of an operator during the work such as pipe laying.

Technical Solution

To accomplish the above object, in accordance with a first embodiment of the present invention, there is provided a hybrid excavator including a device that brings an electro-hydraulic actuator mounted thereon to a quick stop, including:

an RCV configured to output a manipulation signal based on a manipulation amount so as to manipulate an work apparatus;

a first detection sensor configured to detect the manipulation signal outputted from the RCV based on the manipulation amount and output a detection signal;

an electric motor;

a second detection sensor configured to detect the number of rotations of an electric motor and output a detection signal;

a hydraulic pump-motor connected to the electric motor;

a hydraulic cylinder connected to the hydraulic pump-motor and configured to be driven to expand and contract in response to supply of hydraulic fluid thereto;

first and second hydraulic valves respectively installed in first and second flow paths between the hydraulic pump-motor and the hydraulic cylinder;

a third hydraulic valve installed in a connection path which is connected to first and second branched flow paths that are branch-connected to first and second flow paths on the upper stream sides of the first and second hydraulic valves and first and second flow paths on the lower stream sides of the first and second hydraulic valves, respectively, and configured to compensate for or bypass a flow rate to overcome a difference in flow rates that occurs when forward and reverse rotation of the hydraulic pump-motor is changed due to a difference in cross-sectional area between a large chamber and a small chamber of the hydraulic cylinder; and a control unit configured to receive the manipulation signal of the RCV from the first detection sensor and the number of rotations of the electric motor from the second detection sensor, compare the received manipulation signal and the number of rotations with data of pre-stored working conditions, and output a control signal for application to the first hydraulic valve or the second hydraulic valve to switch the first hydraulic valve or the second hydraulic valve so that the hydraulic fluid is blocked from being fed hack to the hydraulic pump-motor from the hydraulic cylinder to suddenly stop the work apparatus.

In according with a more preferable embodiment, the first and second hydraulic valves may be implemented as on off type hydraulic valves that are shifted in response to the application of the control signal thereto from the control unit to open/close the first and second flow paths.

The first and second hydraulic valves may be implemented as proportional control type hydraulic valves configured to output a secondary signal pressure that is in proportion to the control signal applied thereto from the control unit.

The hybrid excavator may further include a third detection sensor configured to detect the number of rotations of the hydraulic pump-motor and transmit a detection signal to the control unit.

The hybrid excavator may further include a fourth detection sensor configured to detect a driving speed of the hydraulic cylinder and transmit a detection signal to the control unit.

The first detection sensor may detect a manipulation angle of the RCV during the manipulation of the RCV and transmit a detection signal to the control unit.

The first detection sensor may detect a pilot signal pressure that is generated based on the manipulation amount of the RCV during the manipulation of the RCV and transmit a detection signal to the control unit.

In accordance with a second embodiment of the present invention, there is provided a hybrid excavator including a device that brings an electro-hydraulic actuator mounted thereon to a quick stop, including:

an RCV configured to output a manipulation signal based on a manipulation amount so as to manipulate an work apparatus;

a first detection sensor configured to detect the manipulation signal outputted from the RCV based on the manipulation amount and output a detection signal;

an electric motor;

a second detection sensor configured to detect the number of rotations of the electric motor and output a detection signal;

a hydraulic cylinder configured to be driven to expand and contract in response to supply of hydraulic fluid thereto;

first and second hydraulic pump-motors connected to the electric motor to discharge and supply a flow rate, which is equal to a ratio of a cross-sectional area of a large chamber to a cross-sectional area of a small chamber of the hydraulic cylinder, to the hydraulic cylinder;

first and second hydraulic valves respectively installed in first and second flow paths between the first and second hydraulic pump-motors and the hydraulic cylinder; and a control unit configured to receive the manipulation signal of the RCV from the first detection sensor and the number of rotations of the electric, motor from the second detection sensor, compare the received manipulation signal and the number of rotations with data of pre-stored working conditions, and output a control signal for application to the first hydraulic valve or the second hydraulic valve to switch the first hydraulic valve or the second hydraulic valve so that the hydraulic fluid is blocked from being fed back to the first and second hydraulic pump-motors from the hydraulic cylinder to cause the work apparatus to be brought to a quick stop.

In according with a more preferable embodiment, the hybrid excavator may further include fifth and sixth detection sensors configured to detect the numbers of rotations of each of the first and second hydraulic pump-motors and transmit detection signals to the control unit.

Advantageous Effect

The hybrid excavator including a device that brings an electro-hydraulic actuator mounted thereon to a quick stop in accordance with embodiments of the present invention as constructed above has the following advantages.

It is possible to quickly stop a work apparatus being operated at high speed upon occurrence of a dangerous situation during the work in which a heavyweight object is moved such as pipe laying using a hybrid excavator, thereby protecting a worker from a safety accident and securing safety of hybrid equipment when the work is performed with the aid of the worker.

BRIEF DESCRIPTION OF THE DRAWINGS

The above objects, other features and advantages of the present invention will become more apparent by describing the preferred embodiments thereof with reference to the accompanying drawings, in which.

EXPLANATION ON REFERENCE NUMERALS OF MAIN ELEMENTS IN THE DRAWINGS

Figure 1:
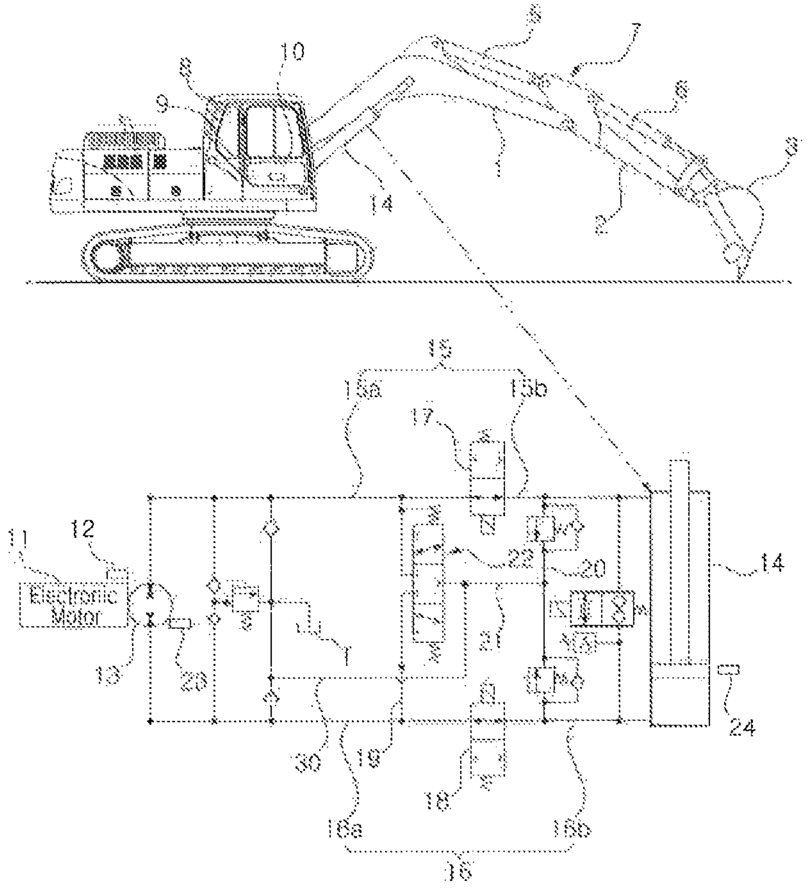
FIG. 1 is a circuit diagram showing a use state of a hybrid excavator including a device that brings an electro-hydraulic actuator mounted thereon to a quick stop in accordance with a first embodiment of the present invention.

10; first detection sensor
11; electric motor
12; second detection sensor
13; hydraulic pump-motor
14; hydraulic cylinder
15; first path
16; second path
17; first hydraulic valve
18; second hydraulic valve
19; first branched flow path
20; second branched flow path
21; connection path
22; third hydraulic valve
23; third detection sensor
24; fourth detection sensor
25; first hydraulic pump-motor
26; second hydraulic pump-motor

PREFERRED EMBODIMENTS OF THE INVENTION

Now, preferred embodiments of the present invention will be described in detail with reference to the accompanying drawings. The matters defined in the description, such as the detailed construction and elements, are nothing but specific details provided to assist those of ordinary skill in the art in a comprehensive understanding of the invention, and the present invention is not limited to the embodiments disclosed hereinafter.

A hybrid excavator including a device that brings an electro-hydraulic actuator (EHA) mounted thereon to a quick stop in accordance with a first embodiment of the present invention as shown in FIG. 1, includes:

an RCV (remote control valve) 9 that outputs a manipulation signal based on a manipulation amount so as to manipulate an work apparatus 7 such as a boom 1 or the like;

a first detection sensor 10 that detects the manipulation signal outputted from the RCV 9 based on the manipulation amount and output a detection signal;

an electric motor-generator (hereinafter, referred to as "electric motor") 11;

a second detection sensor 12 that detects the number of rotations of the electric motor 11 and output a detection signal;

a hydraulic pump-motor 13 that is connected to the electric motor 11;

a hydraulic cylinder 14 that is connected to the hydraulic pump-motor 13 and is driven to expand and contract in response to supply of hydraulic fluid thereto;

first and second hydraulic valves 17 and 18 that are respectively installed in first and second flow paths 15 and 16 between the hydraulic pump-motor 13 and the hydraulic cylinder 14;

a third hydraulic valve 22 that is installed in a connection path 21 which is connected to first and second branched flow paths 19 and 20 that are branch-connected to first and second flow paths 15*a* and 16*a* on the upper stream sides of the first and second hydraulic valves 17 and 18 and first and second flow paths 15*b* and 16*b* on the lower stream sides of the first and second hydraulic valves 17 and 18, respectively, and is configured to compensate for or bypass a flow rate to overcome a difference in flow rates that occurs when forward and reverse rotation of the hydraulic pump-motor 13 is changed due to a difference in cross-sectional area between a large chamber and a small chamber of the hydraulic cylinder 14; and a control unit (not shown) that receives the manipulation signal of the RCV from the first detection sensor 10 and the number of rotations of the electric motor from the second detection sensor 12, compares the received manipulation signal and the number of rotations with data of pre-stored working conditions, and outputs a control signal for application to the first hydraulic valve 17 or the second hydraulic valve 18 to switch the first hydraulic valve 17 or the second hydraulic valve 18 so that the hydraulic fluid is blocked from being fed back to the hydraulic pump-motor 13 from the hydraulic cylinder 14 to cause the work apparatus (for example, referring to "boom") descending at high speed to be brought to a quick stop.

The first and second hydraulic valves 17 and 18 are implemented as on/off type hydraulic valves that are shifted in response to the application of the control signal thereto from the control unit to open/close the first and second flow paths 15 and 16.

The first and second hydraulic valves 17 and 18 are implemented as proportional control type hydraulic valves that output a secondary signal pressure that is in proportion to the control signal applied thereto from the control unit.

The hybrid excavator further includes a third detection sensor 23 that detects the number of rotations of the hydraulic pump-motor 13 and transmits a detection signal to the control unit.

The hybrid excavator further includes a fourth detection sensor 24 that detects a driving speed of the hydraulic cylinder 14 and transmits a detection signal to the control unit.

The first detection sensor 10 detects a manipulation angle of the RCV during the manipulation of the RCV by an operator and transmits a detection signal to the control unit.

The first detection sensor 10 detects a pilot signal pressure that is generated based on the manipulation amount of the RCV during the manipulation of the RCV by an operator and transmits a detection signal to the control unit.

In this case, the configuration of the work apparatus 7, which includes a boom 1, an arm 2, and a bucket 3, and is driven by a boom cylinder 14, an arm cylinder 5, and a bucket cylinder 6, and an operator's cab 8 is the same as that of an excavator in the art to which the present invention pertains, and thus the detailed description of the configuration and operation of the work apparatus 7 and the operator's cab 8 will be omitted to avoid redundancy.

Hereinafter, Hereinafter, a use example of the hybrid excavator including a device that brings an electro-hydraulic actuator mounted thereon to a quick stop in accordance with a first embodiment of the present invention will be described in detail with reference to the accompanying drawings.

As shown in FIG. 1, in the case where an operator manipulates an RCV 9 to descend the work apparatus at high speed in order to lift and carry a heavyweight object using the boom as in a pipe-laying work, a detection signal outputted by the first detection sensor 10 that detects a manipulation signal of the RCV 9 during the manipulation of the RCV 9 is transmitted to the control unit. In addition, a detection signal outputted by the second detection sensor 12 that detects the number of rotations of the electric motor 11 is transmitted to the control unit.

Thus, the control unit receives the manipulation signal of the RCV by the operator from the first detection sensor 10 and the number of rotations of the electric motor front the second detection sensor 12, and compares the received manipulation signal and the number of rotations with data of pre-stored working conditions. Thereafter, if the electric motor 11 is driven at a speed more than a predetermined speed, the control unit outputs a control signal for application to the first hydraulic valve 17 installed in the first flow path 15 or the second hydraulic valve 18 installed in the second flow path 15 to switch the first hydraulic valve 17 or the second hydraulic valve 18. Thus, the first hydraulic valve 17 or the second hydraulic valve 18 is switched to cause the first flow path 15 or the second flow path 16 to be interrupted, so that the hydraulic fluid is blocked from being fed back to the hydraulic pump-motor 13 from the hydraulic cylinder (i.e., boom cylinder) 14 along the first and second flow path 15 and 16, and thus the boom descending at high speed can be brought to a quick stop.

When forward and reverse rotation of the hydraulic pump-motor 13 is changed to supply the hydraulic fluid front the hydraulic pump-motor 13 to a large chamber of the hydraulic cylinder 14 via the second flow path 16 or a small chamber of the hydraulic cylinder 14 via the first flow path 15, a difference in flow rates may occur due to a difference in cross-sectional area between the large chamber and the small chamber of the hydraulic cylinder 14.

In other words, when the hydraulic fluid from the hydraulic pump-motor 13 is supplied to the large chamber of the hydraulic cylinder 14 via the second flow path 16 and the hydraulic fluid from the small chamber of the hydraulic cylinder 14 is fed back to the hydraulic pump-motor 13 via the first flow path 15 to cause the hydraulic cylinder 14 to be driven to expand, a flow rate of the hydraulic fluid fed back to the hydraulic pump-motor 13 from the small chamber of the hydraulic cylinder 14 is lower than that of the hydraulic fluid supplied to the large chamber of the hydraulic cylinder 14, and thus a deficit flow rate is compensated for by the third hydraulic valve 22. That is, when the third hydraulic valve 22 is shifted upwardly on the drawing sheet, the hydraulic fluid flowing on the first flow path 15 sequentially passes through the third hydraulic valve 22 and the connection path 21 in this order, and then joins the hydraulic fluid flowing on the second flow path 16 and is introduced into the large chamber of the hydraulic cylinder 14.

On the other hand, when the hydraulic fluid from the hydraulic pump-motor 13 is supplied to the small chamber of the hydraulic cylinder 14 via the first flow path 15 and the hydraulic fluid from the large chamber of the hydraulic cylinder 14 is fed back to the hydraulic pump-motor 13 via the second flow path 16 to cause the hydraulic cylinder 14 to be driven to contract, a flow rate of the hydraulic fluid fed back to the hydraulic pump-motor 13 from the large chamber of the hydraulic cylinder 14 is higher than that of the hydraulic fluid supplied to the small chamber of the hydraulic cylinder 14, and thus a surplus flow rate is by-passed by the third hydraulic valve 22. That is, when the third hydraulic valve 22 is shifted downwardly on the drawing sheet, the hydraulic fluid flowing on the second flow path 16 sequentially passes through the first branched flow path 19, the third hydraulic valve 22, and a drain line 30 in this order, and then is drained to a hydraulic tank T.

Figure 2:
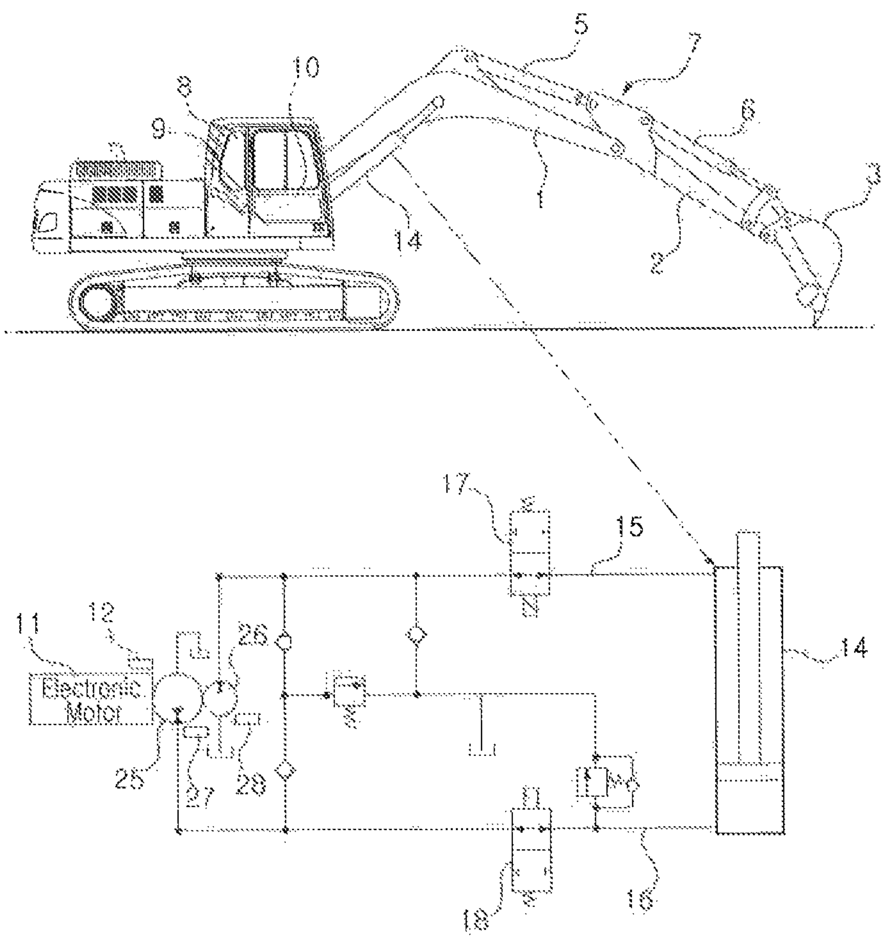
FIG. 2 is a circuit diagram showing a use state of a hybrid excavator including a device that brings an electro-hydraulic actuator mounted thereon to a quick stop in accordance with a second embodiment of the present invention.
Figure 3:
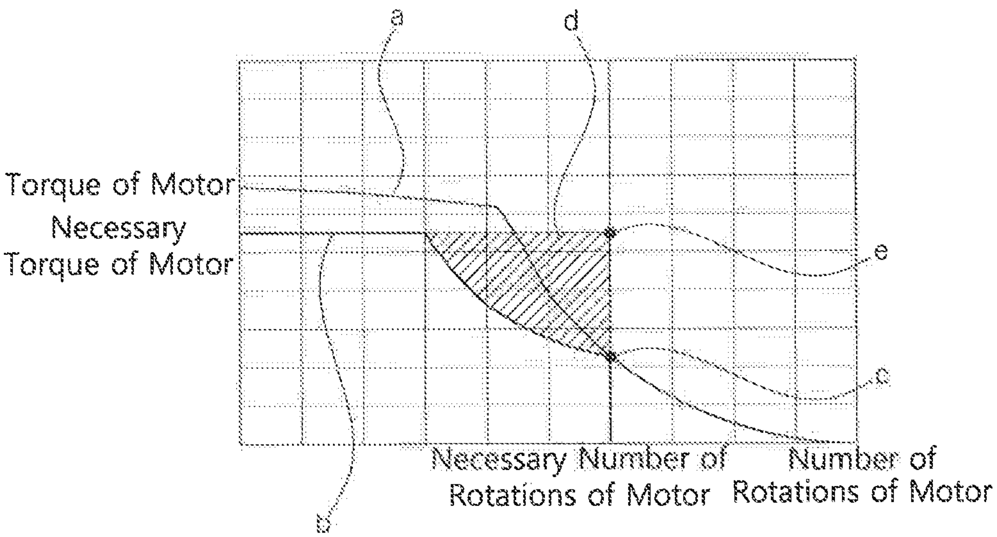
FIG. 3 is a graph showing the characteristics of an electro-hydraulic actuator.

A hybrid excavator including a device that brings an electro-hydraulic actuator (EHA) mounted thereon to a quick stop in accordance with a second embodiment of the present invention as shown in FIG. 2, includes:

an RCV 9 that outputs a manipulation signal based on a manipulation amount so as to manipulate an work apparatus 7 such as a boom 1 or the like;

a first detection sensor 10 that detects the manipulation signal outputted from the RCV 9 based on the manipulation amount and output a detection signal;

an electric motor 11;

a second detection sensor 12 that detects the number of rotations of the electric motor 11 and output a detection signal;

a hydraulic cylinder 14 that is driven to expand and contract in response to supply of hydraulic fluid thereto;

first and second hydraulic pump-motors 25 and 26 that are connected to the electric motor to discharge and supply a flow rate, which is equal to a ratio of a cross-sectional area of a large chamber to a cross-sectional area of a small chamber of the hydraulic cylinder 14, to the hydraulic cylinder 14;

first and second hydraulic valves 17 and 18 that are respectively installed in first and second flow paths 15 and 16 between the first and second hydraulic pump-motors 25 and 26 and the hydraulic cylinder 14; and a control unit (not shown) that receives the manipulation signal of the RCV from the first detection sensor 10 and the number of rotations of the electric motor from the second detection sensor 12, compares the received manipulation signal and the number of rotations with data of pre-stored working conditions, and outputs a control signal for application to the first hydraulic valve 17 or the second hydraulic valve 18 to switch the first hydraulic valve 17 or the second hydraulic valve 18 so that the hydraulic fluid is blocked from being fed back to the first and second hydraulic pump-motors 25 and 26 from the hydraulic cylinder 14 to cause the work apparatus to be brought to a quick stop.

In according with a more preferable embodiment, the hybrid excavator further includes fifth and sixth detection sensors 27 and 28 that detects the numbers of rotations of each of the first and second hydraulic pump-motors 25 and 26 and transmits detection signals to the control unit.

In this case, the configuration of the excavator in accordance with the second embodiment shown in FIG. 2 is the same as that of the excavator in accordance with the first embodiment shown in FIG. 1 except the first and second hydraulic pump-motors 25 and 26 having a discharge flow rate, which is equal to a ratio of a cross-sectional area of a large chamber to a cross-sectional area of a small chamber of the hydraulic cylinder 14. Thus, the detailed description of the same configuration and operation thereof will be omitted avoid redundancy, and the same elements are denoted by the same reference numerals.

Hereinafter, a use example of the hybrid excavator including a device that brings an electro-hydraulic actuator (EHA) mounted thereon to a quick stop in accordance with the second embodiment of the present invention will be described in detail with reference to the accompanying drawings.

As shown in FIG. 2, it is possible for the first and second hydraulic pump-motors 25 and 26 to overcome a difference in flow rates that occurs when forward and reverse rotation of the first and second hydraulic pump-motors 25 and 26 is changed due to a difference in cross-sectional area between the large chamber and the small chamber of the hydraulic cylinder 14. In other words, the first and second hydraulic pump-motors 25 and 26 have a discharge flow rate, which is equal to a ratio of a cross-sectional area of the large chamber to a cross-sectional area of the small chamber of the hydraulic cylinder 14. Thus, even when the cross-sectional areas between the large chamber and the small chamber of the hydraulic cylinder 14 is different from each other, the hydraulic fluid can be supplied to the hydraulic cylinder 14 under the optimal conditions.

While the present invention has been described in connection with the specific embodiments illustrated in the drawings, they are merely illustrative, and the invention is not limited to these embodiments. It is to be understood that various equivalent modifications and variations of the embodiments can be made by a person having an ordinary skill in the art without departing from the spirit and scope of the present invention. Therefore, the true technical scope of the present invention should not be defined by the above-mentioned embodiments but should be defined by the appended claims and equivalents thereof.

INDUSTRIAL APPLICABILITY

As described above, according to the hybrid excavator including a device that brings an electro-hydraulic actuator mounted thereon to a quick stop in accordance with embodiments of the present invention, when an operator manipulates the work apparatus, particularly lowers the work apparatus at high speed while watching the movement of a heavyweight object and a worker using a hybrid excavator such as a pipe-laying work, it is possible to quickly stop the work apparatus being operated at high speed upon occurrence of an unexpected dangerous situation, thereby protecting the worker from a safety accident and securing safety of hybrid equipment.

The invention claimed is:

1. A hybrid excavator including a device that brings an electro-hydraulic actuator mounted thereon to a quick stop, comprising:

an RCV configured to output a manipulation signal based on a manipulation amount so as to manipulate an work apparatus 7;

a first detection sensor configured to detect the manipulation signal outputted from the RCV based on the manipulation amount and output a detection signal;

an electric motor;

a second detection sensor configured to detect the number of rotations of the electric motor and output a detection signal;

a hydraulic pump-motor connected to the electric motor;

a hydraulic cylinder connected to the hydraulic pump-motor and configured to be driven to expand and contract in response to supply of hydraulic fluid thereto;

first and second hydraulic valves respectively installed in first and second flow paths between the hydraulic pump motor and the hydraulic cylinder;

a third hydraulic valve installed in a connection path which is connected to first and second branched flow paths that are branch-connected to first and second flow paths on the upper stream sides of the first and second hydraulic valves and first and second flow paths on the lower stream sides of the first and second hydraulic valves, respectively, and configured to compensate for or bypass a flow rate to overcome a difference in flow rates that occurs when forward and reverse rotation of the hydraulic pump-motor is changed due to a difference in cross-sectional area between a large chamber and a small chamber of the hydraulic cylinder; and a control unit configured to receive the manipulation signal of the RCV from the first detection sensor and the number of rotations of the electric motor from the second detection sensor, compare the received manipulation signal and the number of rotations with data of pre-stored working conditions, and output a control signal for application to the first hydraulic valve or the second hydraulic valve to switch the first hydraulic valve or the second hydraulic valve so that the hydraulic fluid is blocked from being fed back to the hydraulic pump-motor from the hydraulic cylinder to cause the work apparatus to be brought to a quick stop.

2. The hybrid excavator according to claim 1, wherein the first and second hydraulic valves are implemented as on/off type hydraulic valves that are shifted in response to the application of the control signal thereto from the control unit to open/close the first and second flow paths.

3. The hybrid excavator according to claim 1, wherein the first and second hydraulic valves are implemented as proportional control type hydraulic valves configured to output a secondary signal pressure that is in proportion to the control signal applied thereto from the control unit.

4. The hybrid excavator according to claim 1, further comprising a third detection sensor configured to detect the number of rotations of the hydraulic pump-motor and transmit a detection signal to the control unit.

5. The hybrid excavator according to claim 1, further comprising a fourth detection sensor 24 configured to detect a driving speed of the hydraulic cylinder 14 and transmit a detection signal to the control unit.

6. The hybrid excavator according to claim 1, wherein the first detection sensor detects a manipulation angle of the RCV during the manipulation of the RCV and transmits a detection signal to the control unit.

7. The hybrid excavator according to claim 1, wherein the first detection sensor detects a pilot signal pressure that is generated based on the manipulation amount of the RCV during the manipulation of the RCV and transmits a detection signal to the control unit.

8. The hybrid excavator according to claim 1, wherein the work apparatus is a boom.

9. A hybrid excavator including a device that brings an electro-hydraulic actuator mounted thereon to a quick stop, comprising:

an RCV configured to output a manipulation signal based on a manipulation amount so as to manipulate an work apparatus;

a first detection sensor configured to detect the manipulation signal outputted from the RCV based on the manipulation amount and output a detection signal;

an electric motor;

a second detection sensor configured to detect the number of rotations of the electric motor and output a detection signal;

a hydraulic cylinder configured to be driven to expand and contract in response to supply of hydraulic fluid thereto;

first and second hydraulic pump-motors connected to the electric motor to discharge and supply a flow rate, which is equal to a ratio of a cross-sectional area of a large chamber to a cross-sectional area of a small chamber of the hydraulic cylinder, to the hydraulic cylinder;

first and second hydraulic valves respectively installed in first and second flow paths between the first and second hydraulic pump-motors and the hydraulic cylinder; and a control unit configured to receive the manipulation signal of the RCV from the first detection sensor and the number of rotations of the electric motor from the second detection sensor, compare the received manipulation signal and the number of rotations with data of pre-stored working conditions, and output a control signal for application to the first hydraulic valve or the second hydraulic valve to switch the first hydraulic valve or the second hydraulic valve 18 so that the hydraulic fluid is blocked from being fed back to the first and second hydraulic pump-motors from the hydraulic cylinder to cause the work apparatus to be brought to a quick stop.

10. The hybrid excavator according to claim 9, wherein the first and second hydraulic valves are implemented as on/off type hydraulic valves that are shifted in response to the application of the control signal thereto from the control unit to open/close the first and second flow paths.

11. The hybrid excavator according to claim 9, wherein the first and second hydraulic valves are implemented as proportional control type hydraulic valves configured to output a secondary signal pressure that is in proportion to the control signal applied thereto from the control unit.

12. The hybrid excavator according to claim 9, further comprising fifth and sixth detection sensors configured to detect the numbers of rotations of each of the first and second hydraulic pump-motors and transmit detection signals to the control unit.

13. The hybrid excavator according to claim 9, further comprising a fourth detection sensor configured to detect a driving speed of the hydraulic cylinder and transmit a detection signal to the control unit.

14. The hybrid excavator according to claim 9, wherein the first detection sensor detects a manipulation angle of the RCV during the manipulation of the RCV and transmits a detection signal to the control unit.

15. The hybrid excavator according to claim 9, wherein the first detection sensor detects a pilot signal pressure that is generated based on the manipulation amount of the RCV during the manipulation of the RCV and transmits a detection signal to the control unit.

16. The hybrid excavator according to claim 9, wherein the work apparatus is a boom.

* * * * *